Aug. 24, 1948.  F. E. BARTHOLY  2,447,728
RADIO DIRECTION AND RANGE INDICATOR
Filed Oct. 28, 1942  3 Sheets-Sheet 2
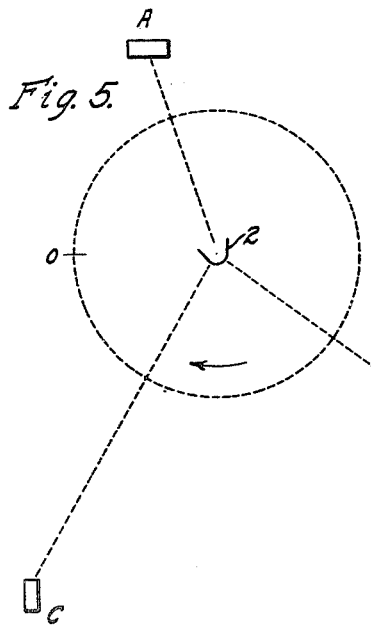
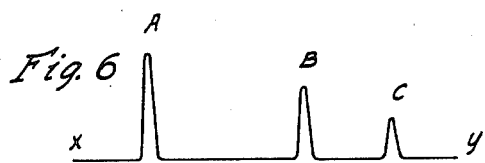
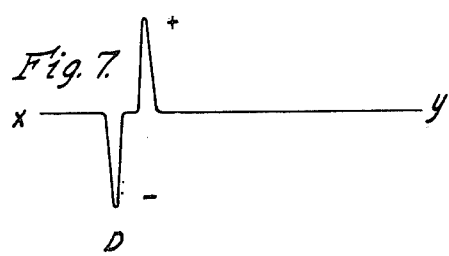
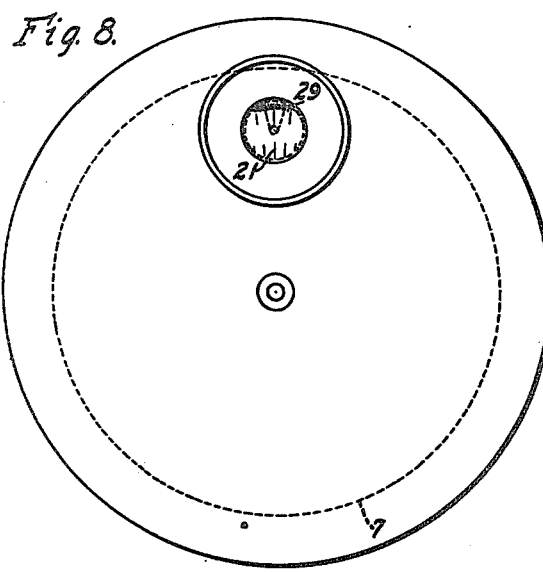
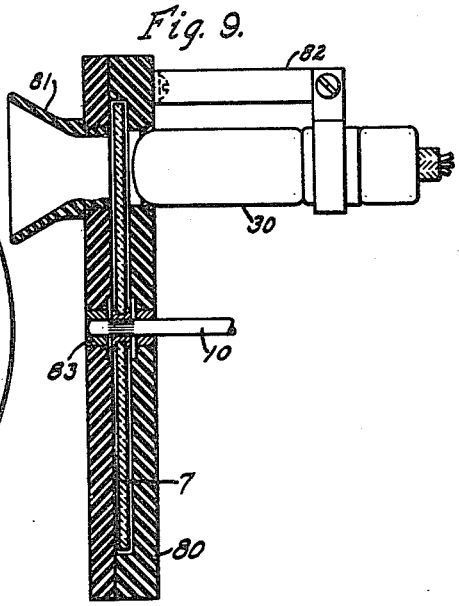
WITNESSES:
Leon M. Garman
INVENTOR
Frederick E. Bartholy.
BY
F. N. Lyle
ATTORNEY

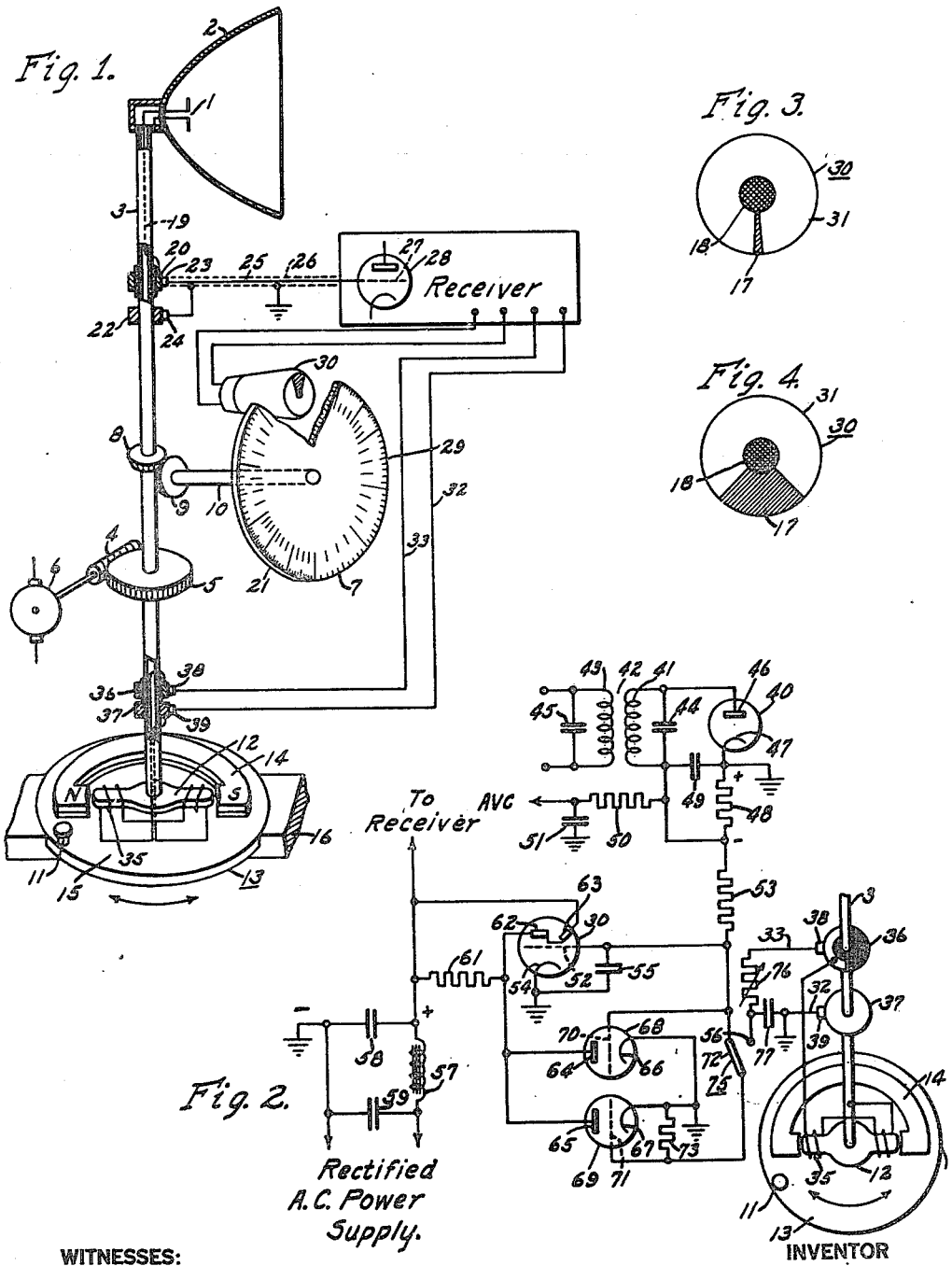

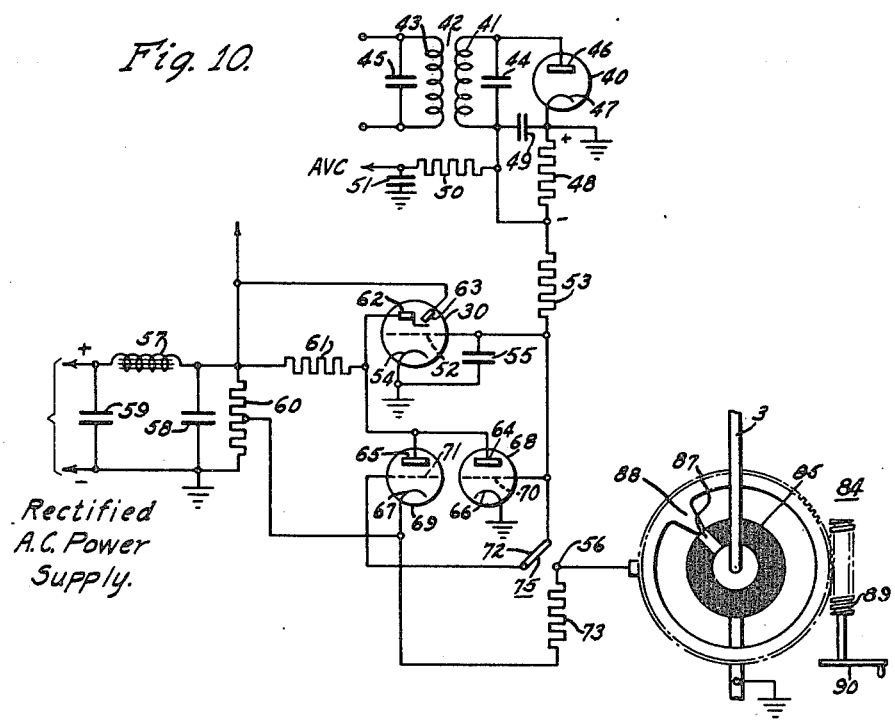

Patented Aug. 24, 1948

2,447,728

UNITED STATES PATENT OFFICE 2,447,728

RADIO DIRECTION AND RANGE INDICATOR

Frederick E. Bartholy, Wilkinsburg, Pa., assignor to Westinghouse Electric Corporation, East Pittsburgh, Pa., a corporation of Pennsylvania Application October 28, 1942, Serial No. 463,621

6 Claims. (Cl. 343—118)

This invention relates to direction and range determining systems employing high frequency electromagnetic waves and, particularly, to systems operating on the reflection of such waves from various objects. Systems of this type are generally known as "radar" systems and are utilized to determine the direction and range of targets either moving or stationary.

The present invention deals with a particullar portion of the radar system, namely, the reception of the reflected signal and the control of apparatus thereby to obtain indication of the direction and the relative distance of the object from which the signal has been reflected. In view of the complexity of complete radar equipment, the description and illustration of this invention has been simplified by showing only the essential elements of the receiving portion. The transmitting part of the system is not shown in view of the fact that in the operation of a radar receiving system the transmitter merely functions as the primary signal source. It may be of any suitable type properly coordinated with the receiver whereby any object in the path of the transmitter shall reflect the energy in such manner as to reach the directional energy collector of the receiver. Basically the system will function when receiving the proper type of radiation whether this radiation is emanating from a primary source or a secondary source such as reflection from an object. For this reason, the object from which wave reflection is received may be regarded as a source of energy as if it would be an individual transmitter.

The primary object of the invention is to indicate the reception of high frequency energy of a continuously moving collector at the instant and for the duration of reception.

Another object of the invention is to correlate the indication of energy reception with the instantaneous position of a moving energy collector continuously at each repeated reception of a selected signal.

A particular feature of this invention is that a dial rotating in unison with a continuously moving energy collector is caused to appear stationary at the time of signal reception whereby the stroboscopic illumination of the markings on the dial can readily be observed. The instantaneous position of the energy collector with respect to a fixed point is thereby directly indicated.

Another feature of the invention is that the means utilized for stroboscopic illumination of the dial indicates not only the relative position of the energy collector but also the relative strength of the received signal energy. When the received energy is due to reflection from an object, called the echo of a transmitted signal, the received signal strength is proportional also to the distance of the reflecting object. In this manner, the indication of the strength of the signal will serve as an indication of the range of the object causing reflection.

Other objects and features will be apparent from the following description of this invention, defined in particularity by the appended claims and taken in connection with the accompanying drawings, in which:

Figure 1 is a view partly in perspective of the indicating system as cooperating elements of the receiver.

Fig. 2 is a schematic circuit diagram of portions of the receiver and a complete circuit of the indicator control.

Fig. 3 and Fig. 4 show the the shadow patterns produced by the electronic indicator tube.

Fig. 5 in connection with Figs. 6 and 7 shows the operation of the system by means of curves for the signal intensities from objects located at different distances from the receiver;

Fig. 8 is a front view of the dial;

Fig. 9 is a view partly in side elevation and partly in section thereof; and

Fig. 10 shows a modification of the selector mechanism as applied to the circuit of Fig. 2.

Referring to Fig. 1, the locator system in accordance with this invention is shown in partial perspective comprising an energy collector in the form of a di-pole 1 housed in a parabolic reflector 2. The reflector together with the di-pole is mounted on a shaft 3 which is rotatable through the worm gear and pinion arrangement 4 and 5, respectively. The motor 6 is coupled to the gear 4. The shaft 3 also drives a dial 7 by means of the beveled gears 8 and 9 and the dial shaft 10. Coupled to the shaft 3 is the armature 12 of the impulse generator 13 which has a permanent magnet field 14. The latter is mounted on a rotatable base 15 which is mounted on the support 16. The arrangement so far described is intended primarily for the illustration of the operation of the invention. The particular drives and couplings shown are chiefly to convey the idea of the interconnection of the various moving members. Other types of mechanical interlinkages may equally be used to form a compact mechanical assembly. The motor 6 can be any suitable motive source preferably a synchronous motor to turn the shaft at a uniform speed and thereby move the di-pole in one coordinate of the bearing which is chosen here as the horizontal coordinate.

Continuing with the description of Fig. 1, the di-pole 1 is connected by means of the conductor 19 to the insulated slip ring 20. The shaft 3 also forms a coaxial conductor in that one of the dipoles is connected to the frame of the reflector which makes firm electrical contact with the shaft. Another slip ring 22 is connected directly with the shaft. On the slip rings 20 and 22 ride brushes 23 and 24, respectively, of which the former is connected by means of the inner conductor 25 of the coaxial transmission line 26 to the input circuit of the receiver, schematically indicated here to be the grid 27 of a tube 28. The transmission line is grounded and connects to the brush 24.

The receiver shown here may be of any suitable type tuned to a particular frequency employed for the operation of the direction finding system. The circuit of the receiver bears no particular relation to the invention herein described. It is preferably a standard superheterodyne type having a signal rectifier which produces a unidirectional potential in proportion with the received carrier amplitude. The detector portion of the receiver and the associated circuit therewith is more fully shown in Fig. 2. The receiver is arranged to energize and control an electron-ray indicator tube 30 which is placed behind the dial 7, as shown by the cutout portion in such manner that when energized, the glow thereof will illuminate the transparent dial and also the shadow angle thereof will cooperate with the peripheral markings 29 of the dial 7.

Connected to the receiver circuit by means of conductors 32 and 33 is the output of the impulse generator 13. The winding 35 of the armature 12 is brought out to the slip rings 36 and 37 on the shaft 3. The slip ring 36 is insulated from the shaft 3 whereas the slip ring 37 contacts the shaft and is at ground potential in the system. Conductors 33 and 32 connect to brushes 38 and 39, respectively, making contact with slip rings 36 and 37.

Examining the mechanical and electrical assembly described in Fig. 1, it is seen that when the motor 6 is energized, the di-pole 1 will sweep the horizontal coordinate of bearing continuously, and as the di-pole is rotating in unison therewith will also rotate the dial 7 as well as the armature 12 of the impulse generator. One set of markings 21 on the dial are so arranged that it will indicate the instantaneous position of the di-pole 1 with respect to a fixed point or starting point. The markings may be in units of degrees or in any other unit which may be selected for determining the horizontal angular displacement of the energy collector with respect to a predetermined starting point. For the purpose of an easy understanding, the position of the energy collector, the dial 7, and the armature 12 of the generator are shown at the starting point where the zero marking of the dial is in line with the center of the electron-ray indicator tube 30. The armature 12 is also directly opposite the north and south pole pieces of the field magnet 14. The latter may be positioned with respect to the armature by means of the knob in both directions shown by the arrow in order to displace the impulse to occur at any particular position of the energy collector. The function of the generator will be described in greater detail later.

Referring to Fig. 2, the detector portion of the receiver is shown here together with the electrical connections to the electron-ray indicator tube 30 and also that of the impulse generator. The rectifier portion of the receiver comprises a diode 40 to which signal is applied from the secondary winding 41 of the transformer 42. The primary winding 43 thereof connects to the conventional amplifying stages of the receiver. When the receiver is a superheterodyne, the transformer 42 would represent the last intermediate frequency stage, the windings 41 and 43 being tuned by means of condensers 44 and 45, respectively, to the particular intermediate frequency chosen. In series with the secondary winding 41 between the anode 46 and cathode 47 of the diode 40 is the diode load-resistance 48 shunted by the condenser 49. The voltage developed across the resistor 48 when the signal input is rectified by the diode is generally applied as a control potential to the amplifier stages of the receiver. This is indicated here by the connection pointing to AVC comprising the resistor 50 and bypass condenser 51. This voltage is also utilized for the control of the electron-ray indicator tube in that the grid 52 thereof connects through filter resistor 53 to the negative terminal of the resistor 48. The cathode 54 of the tube 30 is grounded in the same manner as the cathode 47 of the diode 40, whereby the potential developed across the resistance 48 will appear between the grid 52 and cathode 54 of the tube 30. Condenser 55 together with resistor 53 forms a filter network for removing the modulation component of the rectified signal voltage when the received carrier contains modulation.

A power supply for energizing the tubes of the radio receiver is shown schematically by the filter comprising the choke 57 and filter condensers 58 and 59. The power transformer and rectifier for obtaining power from an alternating-current source are not shown here. The negative terminal of the supply is grounded and the positive side is connected to the anode load resistance 61 which connects to the anode 62 of the tube 30. The target 63 thereof connects directly to the positive side of the supply. Effectively in shunt with the anode 62 and the cathode 54 are the anodes 64 and 65 and cathodes 66 and 67, of the tubes 68 and 69, respectively. The control grid 70 of the tube 68 connects to the control grid 52 of the indicator tube 30. The control grid 71 of the tube 69 connects to the moving contact 72 of the switch 75. One position of the contact 72 connects the grid 71 in shunt with the grid 70, whereas the other position connects the grid 71 to the output of the impulse generator through a network comprising the resistance 76 and condenser 77.

The electron-ray indicator tube used in connection with the system herein described is well known in the art and has been widely employed in broadcast receivers for indicating the tuning of the set to a broadcasting station. It is essentially a small cathode ray device of particular construction giving visual indication in accordance with the intensity of a control voltage. The indication is provided by the varying area of a shadowed sector within a luminous ring. In Fig. 3 the front view of the indicator tube 30 is seen with a small shadow angle 17 terminating in the dark bead 18 in the center of the tube. The luminous area is marked by reference character 31. In Fig. 4 the shadow angle 17 is fully expanded and indicates the condition when no control voltage is applied to the grid 52 in Fig. 2, The illumination produced by the luminous area 31 is of a fluorescent character giving a greenish glow of moderate intensity. Therefore, the tube 30 used for illuminating the dial is preferably enclosed in a housing in order to be shaded from outside light. A preferred embodiment in the construction of the dial assembly is shown in Figs. 8 and 9 which will be described prior to Figs. 5, 6 and 7. The latter will be referred to when considering the operation of the direction finding system.

In Fig. 9, the housing 80 is shown in cross section including a hood 81 in front of the tube 30 which prevents direct illumination of the dial by daylight, whereby the markings thereon are visible only when the tube 30 glows. A bracket 82 may be mounted on the housing 80 to hold the tube 30 in suitable alignment with the dial. The shaft 10 of the revolving dial 7 is supported in the bearing 83. In Fig. 8, the dial assembly is shown in a front elevational view when the dial is illuminated by the tube 30, the shadow angle 17 intersecting the peripheral markings 29 of the dial 7, whereas the scale 21 is intersected by the bead 18.

In systems utilized for target detection a high frequency radio beam is transmitted from a rotating radiator in fixed synchronism with a rotating receiving antenna. The wave reflected from the object is received by the receiving antenna which, having sharp directional characterestics, permits obtaining a signal only at the instant when the reflected wave is directly in line with the instantaneous position of the antenna. At that instant, the position of the receiving antenna is an indication of the position of the object with respect to the receiver, and the received signal strength is inversely related to the distance of the object. The position of the antenna at the instant of maximum signal reception must be indicated with respect to the horizontal directional bearings. To cover a large area of the horizon several combined transmitting and receiving systems may be used, each of the antennae being tilted at a fixed angle.

In the system in accordance with the present invention, the direction as well as the range, i. e. the distance, of the object is shown by the electron-ray indicator tube. Let us assume that the energy collecting receiving antenna 1 in Fig. 1, will begin to rotate from the position shown. The dial 7 has the zero reference mark of the scale 21 which determines the angular displacement of the antenna coinciding the center bead 18 projected by the indicator tube 30. The switch 75 is in the position shown in Fig. 2 so the impulse generator output is switched off. The tubes 68 and 69 are effectively in parallel. When no signal is being received, there is no rectification by the diode 40 and no potential appears across the resistor 48. The grid 52 of the indicator tube 30 in the absence of voltage across the resistor 48 is effectively at ground potential. The same condition prevails for the tubes 68 and 69 so that maximum plate current will be drawn by both of these tubes. The plate current must flow through the anode load resistor 61 of the tube 30, producing sufficient voltage drop thereacross to lower the voltage on the anode 62 whereby the tube 30 will not glow. The tube 30 will glow only when the rated anode voltage is applied to the anode 62. It should be borne in mind that whenever the tube 68 or the tube 69 draws current, the electron-ray tube 30 will not glow.

Let us refer now to Fig. 5 which is helpful in understanding the operation of the direction-finding system. In the center of a circle representing its horizontal sweep is the reflector 2, shown as pointed directly at the object A. It is understood that the reflector 2 rotates in the direction of the arrow continuously. The object A in a radar system would be the target from which reflection of the transmitted wave occurs. It may also represent a transmitter from which high frequency waves are transmitted and the location of which is to be determined. Suffice it to say that at the instant when the reflector 2 is in direct alignment with the object A, maximum signal intensity reaches the receiver and a signal impulse will be received as the reflector 2 sweeps the horizon. This impulse is shown in Fig. 6 by the curve A which may represent the voltage amplitude to the input of the rectifier 40. As the receiver antenna, namely, the reflector 2, continues its rotation, it will receive another impulse from the reflection of the object B when it is in direct alignment therewith. The received impulse is shown by the curve B in Fig. 6 and is of smaller magnitude than that of A. The reason for this is that the object B is at a greater distance from the reflector than the object A. The intensity of the reflected wave, therefore, will be less. Similarly, if the antenna 2 continues to rotate, the next impulse received will be from the object C which is at the greatest distance from the receiver and, therefore, will result in a signal of the least intensity shown by the curve C in Fig. 6. When a signal reaches the receiver and a rectified voltage is produced in the diode circuit, the magnitude of the voltage will depend upon the received signal intensity. Therefore, the negative bias voltage on the grid 52 of the indicator tube 30 will be in proportion to the received signal intensity. The shadow angle produced in these tubes varies from 0 to 90° within certain specified voltage limits, that is, at 0 volts when the grid 52 is at cathode potential, the maximum shadow will form a 90° angle, and one-fourth of the surface will be dark, whereas three-fourths illuminated. As the voltage on the grid 52 increases in the negative sense, the shadow angle will close until the complete tube surface is brightly illuminated. It is seen then that the strength of the received signal will govern the width of the shadow angle which cooperates as an indicating means with scale 29 of the dial. This can be seen in Fig. 8 in cooperation with the scale 29. If the scale is marked in certain units of distance, designating the reflection of a transmitter of known power from various objects, the range may readily be indicated by the number of markings cooperating with the area of the shadow.

To produce a shadow, it is, of course, necessary that the indicator tube 30 be properly energized with operating potentials. Referring to Fig. 2, it is seen that the vacuum tube 68 controls the energization of the electron tube 30 in that when the vacuum tube 68 draws plate current, the indicator tube 30 will not be illuminated because its anode voltage is lowered to a value insufficient for its energization. On the other hand, when the vacuum tube 68 is biased drawing little or no plate current, there is less or no voltage drop across the anode resistor 61, and the anode 62 receives proper operating potentials. The same situation holds for the tube 69 when it is in parallel with the tube 68. Either one or both drawing plate currents will prevent the glow of the electron-ray tube 30. Inasmuch as the grid 70 of the tube 68 is connected to the source of control potential from the diode circuit, at the instant when a signal is being received, the bias voltage will control the anode current conductivity of the tube 68 as well as that of the tube 69 when the switch 75 is in the position shown in Fig. 2. Consequently, at the instant when a signal is received, the tubes 68 and 69 will be blocked and the control tube 30 instantaneously energized to produce an illuminating glow. The illumination of the tube 30 being controlled by the signal only, a stroboscopic effect is produced and the revolving dial 7 will be illuminated only at the instant and for the duration of signal reception.

Referring now to Fig. 3, it will be seen that the control tube 30 will illuminate the dial when the revolving antenna is energized by the reflection from the object A and then from the object B and thereafter the object C. Since the position of the dial is always the same, being rotated by the revolving antenna, the illumination will occur only when the markings corresponding to these positions appear. Consequently, the markings will appear stationary as if the dial would be arrested in motion every time. If the rotation is sufficiently fast past the time where the persistence of vision cannot separate the recurring instances, the particular marking on the dial will appear stationary for all signals. If only one object is being intercepted by the revolving antenna as it makes a complete 360° rotation, only one number or marking of the dial scale 21 will appear, indicating the direction of the reflecting object from the reference or starting point. However, if more than one object reflects onto the revolving antenna, the markings indicating the direction for each would appear superposed and difficult to identify for each object. In order to be able to select only one object of those from which the antenna receives wave reflection, the system in accordance with this invention incorporates a simple selector in the form of the impulse generator previously referred to in describing Figs. 1 and 2. The function of the impulse generator is shown in Fig. 7. Essentially it is a small alternating-current generator having a fixed permanent magnet field of narrow pole pieces and an armature shaped so that it will engage the pole pieces only for a small fraction of time as it rotates.

The resulting alternating-current wave form is shown in Fig. 7 representing an impulse obtained from one revolution of the armature 12. The curves of Fig. 6 and Fig. 7 are drawn to the same time scale representing from the point X to the point Y a complete revolution of the antenna, that is, 360° rotation. The impulse shown in Fig. 7 represents the output of the generator which is impressed on the grid 71 of the tube 69 when the switch 75 engages contact 56. This impulse occurs during one-half revolution of the armature in view of the fact that for the other half the brush 38 contacts the insulated portion of the slip ring 36. In this manner the generator will deliver an impulse only once for the complete revolution of the antenna. The negative half wave of the impulse will block the tube 69 in the same manner as the bias voltage blocks the tube 68 due to arrival of a signal in the detector stage. Now then, if the switch 75 is in the position to engage the contact 56, the tube 69 will draw plate current always except at one impulse of the generator. This will be the negative impulse shown at D in Fig. 7. This condition will maintain the electron tube 30 inoperative as to illumination for all but one instance when the negative half cycle of the generator voltage is impressed on the grid 71. If this is coincident with the occurrence of a signal, the dial 7 will be illuminated only once in its complete revolution and only at the time and for the duration of the reflected signal. To synchronize the generator impulse with the signal impulse, the permanent field 14 of the generator may be rotated by means of the knob 11 to produce the desired unblocking voltage at the time when the desired high frequency signal impulse is being received. Once this setting is obtained, the dial will be illuminated only once in every revolution showing the marking corresponding to the instantaneous position of the antenna at the particular signal reception.

The procedure is simple in that to start out, the switch 75 is placed in the position shown in Fig. 2 whereby control of the illumination of the dial depends entirely on the signals being received. If only one number appears on the dial, no synchronization is necessary and the impulse generator need not be used. If more than one number appears in superposition, the switch 75 is placed to engage the contact 56, and the field of the generator is rotated slowly in either one or the other direction shown by the arrow in Fig. 1 until the dial is again illuminated. One number will appear with a certain shadow angle showing the distance of the reflecting object. To find the other signal source of the other object, the generator field is again rotated. The dial will remain dark until the voltage output of the generator will have its negative voltage wave in synchronism with the signal wave received from the reflecting object. It is desirable to have the width of the negative half cycle of the generator output at least as wide, if not wider, than the signal pulse to assure blocking of the tube 69 for the duration of signal reception. The maximum width is determined by the physical shape of the pole piece and the armature and is so calculated that the resultant pulse be as wide if not wider than the width of the received signal pulse. The pulse width may be narrowed by adjusting the resistor 76 which is combination with the condenser 77 forms a differentiating circuit.

Another form of selection of desired signal indication is shown in Fig. 10 where in place of the impulse generator a simple rotary switch is employed to control the proper biasing of the control tube 69. The elements of Fig. 2 appearing in Fig. 10 are marked with identical reference characters. It will be seen that the circuit is altered only in minor particulars. The cathode 67 of the tube 69 is returned here for a suitable positive trip of the voltage divider resistor for shunting the output of the power supply. Now if the grid 71 is returned to the ground potential side of the system there will be a negative voltage applied to the grid in that the cathode 67 will be positive with respect to grid 71. This condition takes place first when the switch 75 is in the position to connect the grid 71 in parallel with the grid 70 of the tube 68. While the tube 69 will not draw current, control will be maintained by the tube 68. When the switch 75 is moved so that the arm 72 engages the contact 56 the grid 71 will be returned to the cathode 67 through the grid resistor 73. The grid 71 then is at zero bias potential so that maximum plate current will be drawn by the control tube 69, preventing illumination of the indicator tube 30.

The rotary control switch 84 is so arranged as to short circuit the resistor 73 to ground potential thereby applying the negative bias developed across one portion of the voltage divider resistor 60 to the grid 71. The switch 84 comprises a rotating contact 85 which has an insulated portion and a conducting segment 87 in direct contact with the shaft 3. A sliding contact 88 is arranged so that it may be positioned around the rotary contact 85 by means of the gear 89 turned by the handle 90. While the contact 88 engages the segment 87, the control tube 69 will be blocked and if at the same time the control tube 68 is blocked by the signal the indicator tube 30 will be illuminated. The coincidental occurrence of the blocking of the tube 69 with the desired signal reception is obtained by positioning of the sliding contact 88 by turning the handle 90. Essentially, the operation is the same as in the embodiment of Fig. 2 where an impulse generator is used and the field thereof is positioned for selecting the desired signal.

I claim as my invention:

1. In a radio direction and range finding system, a signal receiver having a directional energy collector rotating in one coordinate of bearing, a dial rotating in synchronism with said collector, markings on said dial corresponding to instantaneous positions of said collector with respect to a fixed point, means at said fixed point for illuminating a portion of said dial, means operable by said receiver for actuating said illuminating means at the instant signal is being received, and means independent of said receiver for limiting the actuation of said illuminating means to a selected signal.

2. In a radio direction and range finding system, a signal receiver having a directional energy collector rotating in one coordinate of bearing, a dial rotating in synchronism with said collector, markings on said dial corresponding to instantaneous positions of said collector with respect to a fixed point, means at said fixed point for illuminating a portion of said dial, means operable by said receiver for actuating said illuminating means at the instant signal is being received and means independent of said receiver for limiting the actuation of said illuminating means to each repeated reception of a selected signal.

3. In a radio direction and range finding system, a signal receiver having a directional energy collector rotating in one coordinate of bearing, a dial rotating in synchronism with said collector, markings on said dial corresponding to instantaneous positions of said collector with respect to a fixed point, means at said fixed point for stroboscopic illumination of a portion of said dial, means operable by said receiver for actuating said illuminating means at the instant signal is being received and means independent of said receiver for limiting the actuation of said illuminating means to each repeated reception of a selected signal.

4. In a radio direction finding system, a rotating directional antenna, a dial rotating in unison therewith and having markings for indicating the position of said antenna with respect to a fixed point, a signal receiver energized by said antenna, an electron-ray indicator disposed to illuminate said dial whereby to make the markings thereon visible, a circuit operatively interconnecting said indicator with said receiver, means for actuating the illumination of said indicator at the instant of and during the duration of signal reception whereby repeated reception of the same signal produces apparent standstill of said dial at a particular marking, and means for preventing illumination of said dial upon reception of other than the selected signal.

5. In a radio direction and range determining system, a rotating directional antenna, a radio receiver connected thereto, a dial rotating in unison therewith, said dial having a set of markings for indicating the position of said antenna with respect to a fixed point and another set of markings in units of range, an electron-ray indicator disposed to illuminate said dial whereby to make the markings thereon visible and of a type producing a shadow angle of controllable width, a circuit operatively interconnecting said indicator with said receiver, means disposed in said circuit for causing illumination of said indicator at the instant of and during the duration of signal reception whereby repeated reception of the same signal produces apparent standstill of said dial at a particular marking, and means in said circuit for controlling the width of said shadow angle of said indicator in accordance with the strength of said received signal the width of said shadow angle in cooperation with said second set of markings being an indication of the range of said signal source.

6. In a radio direction and range determining system, a rotating directional antenna, a radio receiver connected thereto, a dial rotating in unison therewith, said dial having a set of markings for indicating the position of said antenna with respect to a fixed point and another set of markings in units of range, an electron-ray indicator disposed to illuminate said dial whereby to make the markings thereon visible and of a type producing a shadow angle of controllable width, a circuit operatively interconnecting said indicator with said receiver, means disposed in said circuit for causing illumination of said indicator at the instant of and during the duration of signal reception whereby repeated reception of the same signal produces apparent standstill of said dial at a particular marking, and means in said circuit for controlling the width of the shadow angle of said indicator in accordance with the strength of said received signal the width of said shadow angle in cooperation with said second set of markings being an indication of the range of said signal source, and means for preventing the illumination of said indicator at the reception of non-selected signals.

FREDERICK E. BARTHOLY.

REFERENCES CITED

The following references are of record in the file of this patent:

UNITED STATES PATENTS

| Number | Name | Date |
|---|---|---|
| 2,026,359 | Pickard | Dec. 31, 1935 |
| 2,079,205 | Gillett | May 4, 1937 |
| 2,130,913 | Tolson | Sept. 20, 1938 |
| 2,191,277 | George | Feb. 20, 1940 |
| 2,226,929 | Hefele | Dec. 31, 1940 |
| 2,257,763 | Petterson | Oct. 7, 1941 |
| 2,282,541 | Bernstein | May 12, 1942 |
| 2,406,800 | Busignies | Sept. 3, 1946 |

FOREIGN PATENTS

| Number | Country | Date |
|---|---|---|
| 487,984 | Great Britain | June 29, 1938 |
| 491,762 | Great Britain | Sept. 8, 1938 |
| 497,147 | Great Britain | Dec. 9, 1938 |
| 113,092 | Australia | May 29, 1941 |